(12) United States Patent
Whitestone et al.

(10) Patent No.: US 12,183,102 B2
(45) Date of Patent: *Dec. 31, 2024

(54) ENHANCED OPTICAL CHARACTER RECOGNITION (OCR) IMAGE SEGMENTATION SYSTEM AND METHOD

(71) Applicant: Capital One Services, LLC, McLean, VA (US)

(72) Inventors: Ian Whitestone, Toronto (CA); Brian Chun-Lai So, Plano, TX (US); Sourabh Mittal, McKinney, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 168 days.

This patent is subject to a terminal disclaimer.

(21) Appl. No.: 17/871,261

(22) Filed: Jul. 22, 2022

(65) Prior Publication Data

US 2023/0008869 A1    Jan. 12, 2023

Related U.S. Application Data

(63) Continuation of application No. 16/915,093, filed on Jun. 29, 2020, now Pat. No. 11,430,202.

(51) Int. Cl.
*G06V 30/00* (2022.01)
*G06F 18/2413* (2023.01)
(Continued)

(52) U.S. Cl.
CPC ...... *G06V 30/1475* (2022.01); *G06F 18/2413* (2023.01); *G06V 10/255* (2022.01);
(Continued)

(58) Field of Classification Search
CPC .. G06V 30/1475; G06V 10/255; G06V 10/30; G06V 10/32; G06V 10/454;
(Continued)

(56) References Cited

U.S. PATENT DOCUMENTS

| 5,031,223 A | 7/1991 | Rosenbaum et al. |
| 5,043,908 A | 8/1991 | Manduley et al. |

(Continued)

FOREIGN PATENT DOCUMENTS

| EP | 0949014 A2 | 10/1999 | |
| WO | WO-2013026868 A1 * | 2/2013 | ........... G06K 9/3233 |

*Primary Examiner* — Ping Y Hsieh
*Assistant Examiner* — Xiao Liu
(74) *Attorney, Agent, or Firm* — HUNTON ANDREWS KURTH LLP

(57) ABSTRACT

Optical character recognition (OCR) based systems and methods for extracting and automatically evaluating contextual and identification information and associated metadata from an image utilizing enhanced image processing techniques and image segmentation. A unique, comprehensive integration with an account provider system and other third party systems may be utilized to automate the execution of an action associated with an online account. The system may evaluate text extracted from a captured image utilizing machine learning processing to classify an image type for the captured image, and select an optical character recognition model based on the classified image type. They system may compare a data value extracted from the recognized text for a particular data type with an associated online account data value for the particular data type to evaluate whether to automatically execute an action associated with the online account linked to the image based on the data value comparison.

16 Claims, 6 Drawing Sheets

(51) Int. Cl.
 *G06V 10/20* (2022.01)
 *G06V 10/30* (2022.01)
 *G06V 10/32* (2022.01)
 *G06V 10/44* (2022.01)
 *G06V 10/75* (2022.01)
 *G06V 10/82* (2022.01)
 *G06V 30/146* (2022.01)
 *G06V 30/19* (2022.01)
 *G06V 30/10* (2022.01)

(52) U.S. Cl.
 CPC .............. *G06V 10/30* (2022.01); *G06V 10/32* (2022.01); *G06V 10/454* (2022.01); *G06V 10/751* (2022.01); *G06V 10/82* (2022.01); *G06V 30/1478* (2022.01); *G06V 30/19* (2022.01); *G06V 30/10* (2022.01)

(58) Field of Classification Search
 CPC .. G06V 10/751; G06V 10/82; G06V 30/1478; G06V 30/19; G06V 30/10; G06F 18/2413
 See application file for complete search history.

(56) References Cited

U.S. PATENT DOCUMENTS

| | | |
|---|---|---|
| 5,050,078 A | 9/1991 | Sansone |
| 5,058,030 A | 10/1991 | Schumacher |
| 5,079,714 A | 1/1992 | Manduley et al. |
| 5,142,482 A | 8/1992 | Sansone |
| 5,146,403 A | 9/1992 | Goodman |
| 5,422,821 A | 6/1995 | Allen et al. |
| 5,514,863 A | 5/1996 | Williams |
| 5,612,889 A | 3/1997 | Pintsov et al. |
| 5,703,783 A | 12/1997 | Allen et al. |
| 5,850,480 A | 12/1998 | Scanlon |
| 5,910,998 A | 6/1999 | Yui |
| 5,936,865 A | 8/1999 | Pintsov et al. |
| 5,984,174 A | 11/1999 | Kato et al. |
| 6,292,709 B1 | 9/2001 | Uhl et al. |
| 9,621,761 B1* | 4/2017 | Abbas ...................... H04N 1/04 |
| 2016/0379184 A1* | 12/2016 | Smith .................. G06Q 10/105 705/14.23 |
| 2019/0266445 A1* | 8/2019 | Chen ....................... G06V 20/62 |
| 2019/0311227 A1* | 10/2019 | Kriegman ........ G06V 30/19173 |
| 2020/0356813 A1* | 11/2020 | Sharma .................. G06V 20/00 |
| 2021/0064866 A1* | 3/2021 | Rezvani ................. G06N 20/00 |

* cited by examiner

Show [10] entries                                                                                         Search: [        ]

| Case ID | Portfolio | Queue | Return Flag | POR Address | DB Address | POR Name | DB Name | Required Action | Action |
|---|---|---|---|---|---|---|---|---|---|
| ☐ 20170420-36 | Costco | Work Case Costco | N | | | FIRST LAST | FIRST LAST | Work Case | ☒ |
| ☐ 20170420-37 | Costco | Work Case Costco | N | | | FIRST LAST | FIRST LAST | Work Case | ☒ |
| ☐ 20170420-38 | Costco | Work Case Costco | N | | | FIRST LAST | FIRST LAST | Work Case | ☒ |
| ☐ 20170420-39 | Costco | Work Case Costco | N | | | FIRST LAST | FIRST LAST | Work Case | ☒ |
| ☐ 20170420-45 | Costco | Work Case Costco | N | | | FIRST LAST | FIRST LAST | Work Case | ☒ |
| ☐ 20170420-46 | Costco | Work Case Costco | N | | | FIRST LAST | FIRST LAST | Work Case | ☒ |
| ☐ 20170424-290 | Hudsons Bay | Add Flag HB/Saks | N | | | FIRST LAST | FIRST LAST | Add Flag | ☒ |
| ☐ 20170424-293 | Hudsons Bay | Add Flag HB/Saks | N | | | FIRST LAST | FIRST LAST | Add Flag | ☒ |
| ☐ 20170420-361 | Hudsons Bay | Add Flag HB/Saks | N | | | FIRST LAST | FIRST LAST | Add Flag | ☒ |
| ☐ 20170420-262 | Hudsons Bay | Add Flag HB/Saks | N | | | FIRST LAST | FIRST LAST | Add Flag | ☒ |

Showing 1 to 10 of 839 entries                                        Previous [1] 2 3 4 5 ... 84 Next

ENHANCED OPTICAL CHARACTER RECOGNITION (OCR) IMAGE SEGMENTATION SYSTEM AND METHOD

CROSS-REFERENCE TO RELATED APPLICATION

This application is a continuation of U.S. patent application Ser. No. 16/915,093 filed Jun. 29, 2020, the complete disclosure of which is incorporated herein by reference in its entirety.

FIELD OF THE DISCLOSURE

The present disclosure relates to optical character recognition (OCR) systems and methods for extracting and automatically evaluating contextual and identification information and associated metadata from an image utilizing enhanced image processing techniques and image segmentation. Enhanced OCR segmentation processing may be utilized to automate execution of an action associated with an online account based on extraction of and processing of contextual and identification information and associated metadata from an image associated with the account.

BACKGROUND

Currently, the automatic execution of actions based on the identification and evaluation of information associated with an image extracted by traditional OCR processing is limited to an inefficient manual process, which exhibits inaccurate and incomplete processing. Further, this manual process of evaluating contextual and identification information and associated metadata extracted from an image via traditional OCR processing results in increased processing time and increased costs associated therewith.

For example, the current manual processing of returned mail, which involves matching an account to a piece of returned mail and comparing the address on the piece of returned mail to the address on file for that account, is time consuming, resource intensive, and inaccurate.

These and other deficiencies exist. Accordingly, there is a need to develop an accurate and efficiency solution to identify and evaluate information associated with an image and to execute responsive actions.

SUMMARY OF THE DISCLOSURE

Various embodiments of the present disclosure provide OCR-based systems and methods for extracting and automatically evaluating contextual and identification information and associated metadata from an image utilizing enhanced image processing techniques and image segmentation. The OCR system may utilize a unique, comprehensive integration with an account provider system and other third party systems to facilitate the real time aggregation and evaluation of data from disparate sources to automate execution of an action associated with an online account based on extraction of and processing of contextual and identification information and associated metadata from an image associated with the account.

An account provider system may include systems associated with, for example, a banking service company such as Capital One®, Bank of America®, Citibank®, Wells Fargo®, Sun Trust®, various community banks, and the like, as well as a number of other financial institutions such as Visa®, MasterCard®, and American Express® that issue credit and/or debit cards, for example, as transaction cards. An account provider system may include and/or be connected to one or more computer systems and networks to process transactions, and may include systems associated with financial institutions that issue transaction cards, including dynamic transaction cards, and maintains a contract with cardholders for repayment. In various embodiments, an account provider system may issue credit, debit, and/or stored value account. An account provider system may include, by way of example and not limitation, depository institutions (e.g., banks, credit unions, building societies, trust companies, mortgage loan companies, pre-paid gift cards or credit cards, etc.), contractual institutions (e.g., insurance companies, pension funds, mutual funds, etc.), investment institutions (e.g., investment banks, underwriters, brokerage funds, etc.), and other non-bank financial institutions (e.g., pawn shops or brokers, cashier's check issuers, insurance firms, check-cashing locations, payday lending, currency exchanges, microloan organizations, crowd-funding or crowd-sourcing entities, third-party payment processors, etc.).

The OCR-based system may include one or more processors and on or more memories coupled to the one or more processors. The one or more processors may include, for example, an OCR application, a confidence matching engine and a case management application. The OCR-based system may capture an image, optimize the image quality of the captured image, perform optical character recognition on the optimized image, and evaluate text extracted from the captured image utilizing machine learning processing to classify an image type for the captured image. Based on image segmentation processing, the system may select an optical character recognition model based on the classified image type and perform optical character recognition on the optimized image utilizing the selected model to generate recognized text and to extract identification and metadata information associated with the image from the recognized text.

The extracted identification and metadata information associated with the image from the recognized text may be evaluated to link the image to an online account associated with image. The system may compare a data value extracted from the recognized text for a particular data type with an associated online account data value for the particular data type to evaluate whether to automatically execute an action associated with the online account linked to the image based on the data value comparison.

The system may utilize various enhanced image processing techniques and technologies to optimize image quality of a captured image prior to performing optical character recognition, which may include computing an angle of skewed text and rotating the image by the computed angle to correct the skew, de-noising, resizing and/or thresholding. As referred to herein, thresholding may be used to create one or more binary images, which may determined by a threshold. For example, an image or any portion thereof may be composed of a plurality of pixels, in which each pixel may be compared with the threshold to determine color setting. For example, if an intensity level of the pixel is less than the threshold, the pixel may be converted to a first color, such as black, and if an intensity level of the pixel exceeds the threshold, the pixel may be converted to a second color, such as white. In this manner, one or more portions of the image may be binarized using the determined threshold values and further processing of the image may continue, such as the enhanced OCR image segmentation processing of the systems and methods disclosed herein.

In one embodiment, expressions may be extracted from the text extracted from the captured image to classify the associated image type. A deep learning image classifier may also be utilized to classify the image type for the captured image.

In one embodiment, the system may generate regions of interest that associate specific areas of the captured image with particular information and to only perform optical character recognition on the regions of interest, which enhance the efficiency and accuracy of the OCR processing. For example a set of coordinates may be determined for each type of image, and the set of coordinates may be associated with a location where a given piece of text is expected to be located. A shape of a blob of text may also be determined to generate the regions of interest associated with the text.

The optical character recognition system may generate a confidence score based on the comparison of the data value extracted from the recognized text with the associated online account data value. The system may evaluate the confidence score based on a determined cutoff value to determine whether to automatically execute the action associated with the online account linked to the image. Machine learning technologies may be utilized by the system to process and cluster the extracted data and associated processing and action information to additional training data for the optical character recognition model.

BRIEF DESCRIPTION OF THE DRAWINGS

FIG. 4 depicts an example user interface for a case management system that may execute actions based on OCR processing, according to embodiments of the disclosure.

DETAILED DESCRIPTION OF THE EMBODIMENTS

Figure 1:
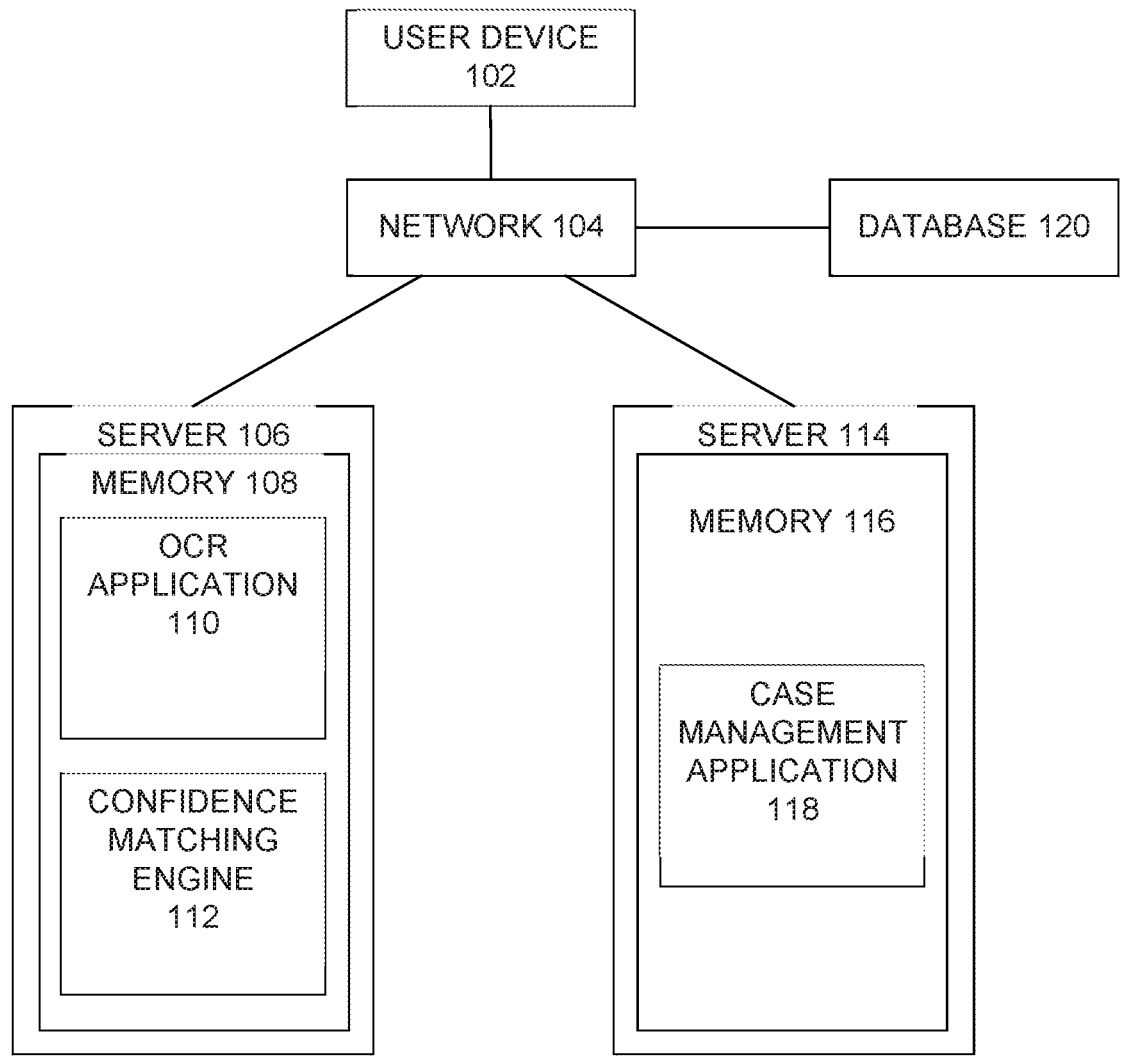
FIG. 1 depicts an example enhanced OCR image segmentation system, according to embodiments of the disclosure.

The following description is intended to convey a thorough understanding of the embodiments described by providing a number of specific example embodiments and details involving OCR-based systems and methods for extracting and automatically evaluating contextual and identification information and associated metadata from an image utilizing enhanced image processing techniques and image segmentation. The OCR system may be fully integrated with an account provider system and other third party systems. This unique integration facilitates the real time aggregation and evaluation of data from disparate sources to automate execution of an action associated with an online account based on extraction of and processing of contextual and identification information and associated metadata from an image associated with the account.

For example, the enhanced OCR image segmentation system may be utilized to automate the processing of returned mail. Once text is recognized from a piece of returned mail, data is extracted and matched to a data identifier, such as an account number, that is associated with the image. The system may compare a second data element extracted from the image, for example the address on the returned mail, with the associated address stored in system for the associated account number, which may be an external system including an account provider system. Based on an evaluation of this comparison the system may determine whether an action is required for an account. For example, for the piece of returned mail, the account may be flagged to identify the account with a return mail indicator that indicates that the system address is incorrect, and to automatically prevent future mail from being sent to that address. The associated action indicator may be generated and displayed via a specialized user interface application. Additionally, an application server may transmit, via a communication interface, a push notification to a user device, via a user application, which includes the associated action indicator.

It should be appreciated, however, that the present disclosure is not limited to these specific embodiments and details, which are examples only. It is further understood that one possessing ordinary skill in the art, in light of known systems and methods, would appreciate the use of the invention for its intended purposes and benefits in any number of alternative embodiments, depending on specific design and other needs. A financial institution and system supporting a return mail processing for a financial institution are used as examples for the disclosure. The disclosure is not intended to be limited to return mail processing only. For example, the enhanced OCR segmentation system may be utilized to facilitate other electronic transactions to validate the identification of images to automate associated actions required based on the identification, and visual workflow builders.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

As described herein, an enhanced OCR system facilitates the automatic evaluation of contextual and identification information and associated metadata from an image. For example, a unique integration of the OCR system with an account provider system and other third party system may be utilized to automate the execution of an action associated with an online account based on the processing of the contextual and identification and associated metadata from an image associated with the account. The system may store an association or link between identification information and a user account, and this association may be transmitted from the OCR system to a financial institution system, or other electronic transaction system, which may be stored on the financial institution's, or other transaction system's backend system. For example the association may include a link between account identifiers (e.g., account holder names, account holder usernames, account numbers, account holder addresses and/or the like), a link between mobile device identifiers (e.g., mobile device numbers, mobile device carriers, mobile device application identifiers, device UUIDs, device UDIDs), a link between transaction cards (e.g., transaction card identifiers, transaction card numbers, and/or the like) of the connected users, and a link between other demographic identifiers (e.g., geolocation, social security number, date of birth, email address, phone number, employee identification number, student identification number, profile picture, and/or the like). It is understood that an association or link can be between one or more types of identification information. Accordingly, using the information that may link a processed image to a connected user account the connected users, upon determining that a condition has occurred, the OCR system may transmit a notification that suggests or automatically triggers the execution of an associated action for the account.

FIG. 1 depicts an example system for enhanced OCE image segmentation processing. As shown in FIG. 1, an example system 100 may include one or more user devices 102, an OCR server 106, and an application server 114 connected over one or more networks 104. Although FIG. 1 illustrates single instance of the components, system 100 may include any number of components, including one or more processors.

System 100 may access system defined action conditions to make or request action on an account based on a condition being satisfied by evaluation of an OCR output. System 100 may have differentiated access to account provider systems and other third party systems, including public data source systems via private Application Programming Interfaces (APIs), and may have differentiated access to connected user devices via private Device APIs. System 100 may make calls to the APIs utilizing a token to provide a secure communication channel. The set of APIs may also provide a secure communication between user device 102, OCR server 106, and application server 114.

Network 104 may be one or more of a wireless network, a wired network or any combination of wireless network and wired network. Network 104 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, a Bluetooth network, or any other wired or wireless network for transmitting and receiving a data signal.

In addition, network 104 may include, without limitation, telephone lines, fiber optics, IEEE Ethernet 902.3, a wide area network ("WAN"), a local area network ("LAN"), a wireless personal area network ("WPAN"), a wide body area network ("WBAN") or a global network such as the Internet. Also network 104 may support an Internet network, a wireless communication network, a cellular network, or the like, or any combination thereof. Network 104 may further include one network, or any number of the example types of networks mentioned above, operating as a stand-alone network or in cooperation with each other. Network 104 may utilize one or more protocols of one or more network elements to which they are communicatively coupled. Network 104 may translate to or from other protocols to one or more protocols of network devices. Although network 104 is depicted as a single network, it should be appreciated that according to one or more embodiments, network 104 may comprise a plurality of interconnected networks, such as, for example, the Internet, a service provider's network, a cable television network, corporate networks, and home networks.

OCR server 106, application server 114, and/or user device 102 may include a network-enabled computer system and/or device. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network.

OCR server 106, application server 114, and/or user device 102 may include at least one central processing unit (CPU), which may be configured to execute computer program instructions to perform various processes and methods. OCR server 106, application server 114, and/or user device 102 may include data storage, including for example, random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel® file, Microsoft® Access® file, a solid state storage device, which may include an all flash array, a hybrid array, or a server-side product, enterprise storage, which may include online or cloud storage, or any other storage mechanism. In some examples, the data storage may include a database, which may comprise a desktop database, a mobile database, or an in-memory database. Further, the database may be hosted internally by the user device 102, server 106, and/or server 114, or the database may be hosted externally to the user device 102, server 106, and/or server 114, by a cloud-based platform, or in any storage device that is in data communication with the user device 102, server 106, and/or server 114. In some examples, database 120 may be in data communication with any number of components of system 100. For example, server 106 may be configured to retrieve the requested data from the database that is transmitted by application 110 via network 104. Without limitation, user device 102, server 106, and/or server 114 may be configured to transmit and/or receive one or more requests for data from the database, and the database may be configured to receive and/or transmit data responsive to the one or more requests from any of user device 102, server 106, and/or server 114. The database 120 may be in direct data communication with the components of system 100 or in communication via network 104.

OCR server 106, application server 114, and user device 102 may further include, for example, a processor, which may be several processors, a single processor, or a single device having multiple processors. Although depicted as single elements, it should be appreciated that according to one or more embodiments, OCR server 106, application server 114, and user device 102, and/or may comprise a plurality of OCR servers 106, application servers 114, and user devices 102. As shown in FIG. 1, OCR server 106, application server 114, and user device 102 may include various components. As used herein, the term "component" may be understood to refer to computer executable software, firmware, hardware, and/or various combinations thereof. It is noted there where a component is a software and/or firmware component, the component is configured to affect the hardware elements of an associated system. It is further noted that the components shown and described herein are intended as examples. The components may be combined, integrated, separated, or duplicated to support various applications. Also, a function described herein as being performed at a particular component may be performed at one or more other components and by one or more other devices instead of or in addition to the function performed at the particular component. Further, the components may be implemented across multiple devices or other components local or remote to one another. Additionally, the components may be moved from one device and added to another device, or may be included in both devices.

As depicted in FIG. 1, user device 102 may be any device capable of communicating via, for example, Bluetooth technology, NFC technology, WiFi Direct technology, and/or the like and execute various functions to transmit and receive data. User device 102 may include components to send and/or receive data for use in other components. User device 102 may be a network-enabled computer. As referred to herein, a network-enabled computer may include, but is not limited to: e.g., a computer device, or communications device including, e.g., a server, a network appliance, a personal computer, a workstation, a mobile device, a phone, a handheld PC, a personal digital assistant, a thin client, a fat client, an Internet browser, or other device. User device 102 also may be a mobile device; for example, a mobile device may be a smart phone, a laptop computer, a tablet computer, a wearable device, and/or any other like mobile device or portable computing device.

User device 102 may include an operating system such as, for example, the iOS® operating system from Apple®, the Google® Android® operating system, and the Windows Mobile® operating system from Microsoft®. For example, user device 102 could be an iPhone, iPod, iPad, and/or Apple Watch from Apple® or other mobile device running Apple's iOS operating system, devices running Google's Android® operating system, including, for example, smartphones running the Android® operating system and other wearable mobile devices, such as Google Glass or Samsung Galaxy Gear Smartwatch, devices running Microsoft's Windows® Mobile operating system, and/or any other smartphone, smartwatch, tablet, or like device, which may include personal assistant devices incorporating systems, such as Alexa, Siri, Google Assistant, and Microsoft Cortana, including home assistant devices such as Amazon Echo, Google Home, and the like.

In various examples according to the present disclosure, user device 102 of system 100 may execute one or more applications, such as software applications, that enable, for example, network communications with one or more components of system 100 and transmit and/or receive data. In some examples, an application may be installed on user device 102, such as a mobile device. An application may include instructions to perform enhanced OCR image segmentation processing, as described herein. In some examples, application 110 may include instructions to determine whether or not to perform enhanced OCR image segmentation processing on client device 102 and/or transmit, via one or more networks 104, the digitized document image to another system, such as a remote database, server, or third party system. User device 102 may be in communication with one or more servers 120 via one or more networks 104, and may operate as a respective front-end to back-end pair with servers 106 and 114. User device 102 may transmit, for example from an application executing on user device 102, one or more requests to servers 106 and 114. The one or more requests may be associated with retrieving data from servers 106 and 114. Servers 106 and 114 may receive the one or more requests from user device 102. Based on the one or more requests from user device 102, servers 106 and 114 may be configured to retrieve the requested data from one or more databases. Based on receipt of the requested data from one or more databases, servers 106 and 114 may be configured to transmit the received data to user device 102, the received data being responsive to one or more requests.

Data associated with the digitized document image may be received, captured, or otherwise obtained through a variety of processes. In some examples, a digitized document image may be received from one or more computing devices, including but not limited to, scanners, sensors, cameras, mobile devices, and the like and/or any combination thereof. In some examples, the image may comprise a .gif, .bmp, .tiff, .png, .jpeg file format or the like. In some examples, the digitized document image may be received from local storage. In some examples, digitized document image may be received from a cloud. For example, cloud computing may comprise an Internet connection between the systems that are operating in the cloud. The cloud may comprise a plurality of systems such that one or more shared resources, such as processing, peripherals, software, data, servers, and the like are provided to any system of the cloud so as to allow access and distribution of services and/or data between the systems of the cloud.

As depicted in FIG. 1, server 102 may include memory 108, OCR application 110, and confidence matching engine 112.

OCR application 110 may access system defined action conditions to make or request an action on an account based on a condition being satisfied by evaluation of an OCR output. The smart transaction conditions may be stored in memory 108. For example, system 100 may receive scanned documents, which may include returned mail for a customer of a financial institution. The scanned document images may be stored in memory on system, which may include memory 108. The scanned document images may be emailed to email address associated with system and all emails may be downloaded and stored in memory on the system, which may include memory 108.

System 100 may utilize OCR application 110 to perform OCR to convert specific areas of the images to text. For example, the system may extract the customer name, address and last 4 digits of their plastic number from the converted image. The system may automatically utilize this extracted information to try and look up the associated customer account in a database on a financial institution system.

Confidence matching engine 112 may evaluate the extracted information utilizing a series of matching algorithms. Once the system determines an account match, confidence matching engine 112 may compare extracted data from the image with associated account data stored in the financial institution system. For example, confidence matching engine 112 may execute a comparison between an address associated with an account in the financial institution system and the address extracted from the image of the returned mail.

Confidence matching engine 112 may be configured to generate a match confidence score based on the comparison of the extracted data and the system data, which the system may evaluate to automatically determine a system executed action for the account, which may include executing a visual workflow builder.

As depicted in FIG. 1, application server 114, may include memory 116 and case management application 118. The system may also utilize a specialized user interface, which may be provided by case management application 118 to execute an action based on the OCR processing. For example, based on extraction information and the confidence score, an account may be flagged and/or queued for processing. For example, the system may transmit particular identified accounts to an application, which may include a web and/or mobile application, which may be accessed via a user interface.

In some examples, exemplary procedures in accordance with the present disclosure described herein may be performed by a processing arrangement and/or a computing arrangement (e.g., computer hardware arrangement). Such processing/computing arrangement may be, for example entirely or a part of, or include, but not limited to, a computer/processor that may include, for example one or more microprocessors, and use instructions stored on a computer-accessible medium (e.g., RAM, ROM, hard drive, or other storage device). For example, a computer-accessible medium may be part of the memory of the user device 102, server 106, server 114, any component of FIG. 1, or other computer hardware arrangement.

In some examples, a computer-accessible medium (e.g., as described herein above, a storage device such as a hard disk, floppy disk, memory stick, CD-ROM, RAM, ROM, etc., or a collection thereof) may be provided (e.g., in communication with the processing arrangement). The computer-accessible medium may contain executable instructions thereon. In addition or alternatively, a storage arrangement may be provided separately from the computer-accessible medium, which may provide the instructions to the processing arrangement so as to configure the processing arrangement to execute certain exemplary procedures, processes, and methods, as described herein above, for example.

Figure 2:
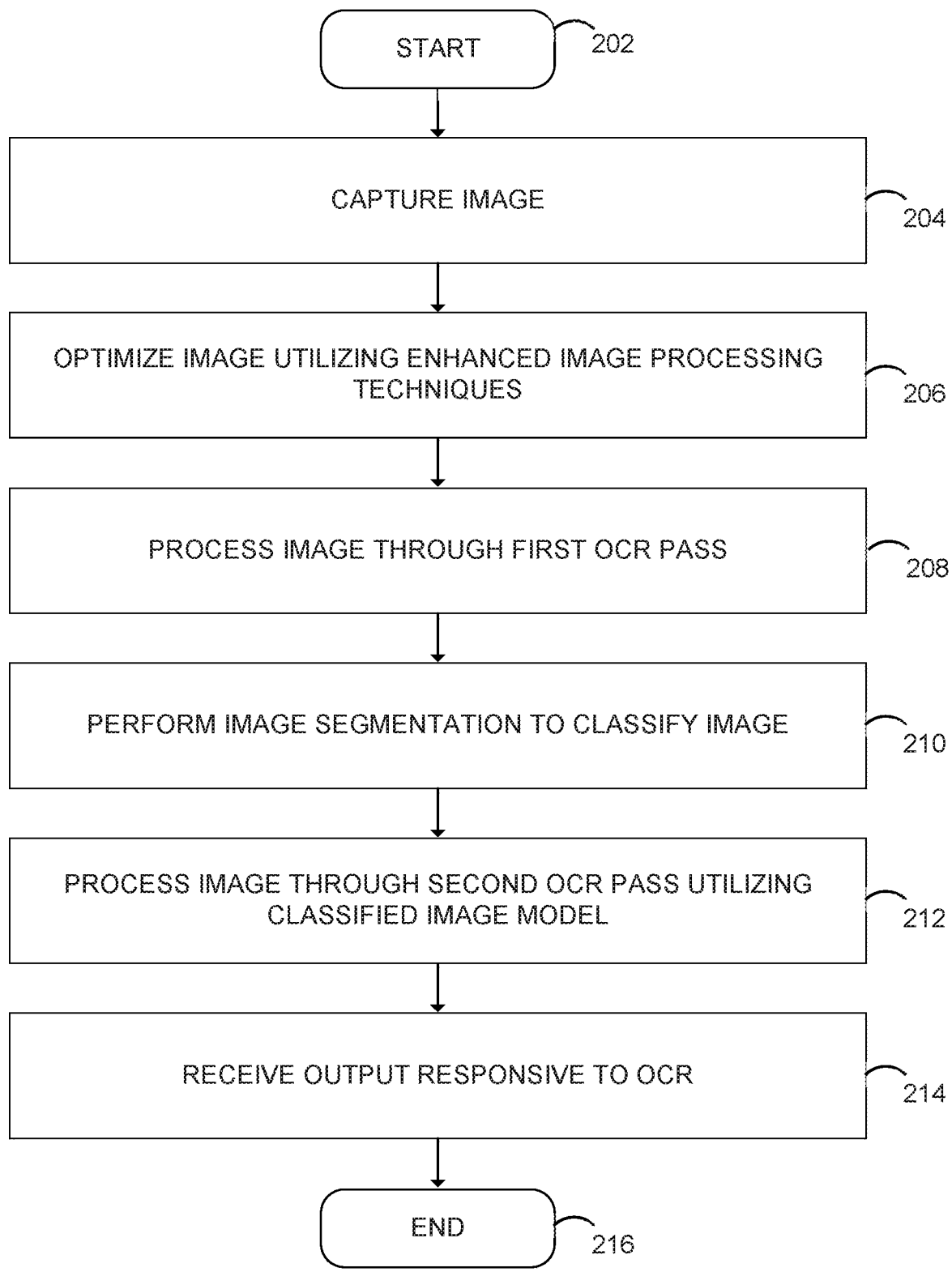
FIG. 2 depicts an example flow diagram illustrating a method for enhanced OCR image segmentation processing, according to embodiments of the disclosure.

FIG. 2 illustrates an example flow diagram illustrating a method for enhanced OCR image segmentation processing, according to embodiments of the disclosure. OCR libraries which may include pre-trained fonts and languages to facilitate OCR processing. The system may also utilize system trained fonts.

The process may begin at block 202. At block 204, system 100 may be configured to capture an image. The image may be received by one or more processors (similar to the one or more processors as described above with respect to FIG. 1). In some examples, the image may comprise a digitized document image. In some examples, data associated with the image may be received, captured, or otherwise obtained through a variety of processes. In some examples, the image may be received from one or more computing devices, including but not limited to, scanners, sensors, cameras, mobile devices, and the like and/or any combination thereof. In some examples, the image may comprise a .gif, .bmp, .tiff, .png, .jpeg file format or the like. In some examples, the image may be received from local storage. In some examples, the image may be received from a cloud. For example, cloud computing may comprise an Internet connection between the systems that are operating in the cloud. The cloud may comprise a plurality of systems such that one or more shared resources, such as processing, peripherals, software, data, servers, and the like are provided to any system of the cloud so as to allow access and distribution of services and/or data between the systems of the cloud.

At block 206, the system may utilize enhanced image processing techniques to optimize the image quality of the received image prior to performing OCR processing. The quality of the received can affect the OCR processing, and by improving image quality, the accuracy and efficiency of the OCR processing of the received image can be improved. For example, a received image may be skewed, as the associated scan may be rotated at an angle. The system may correct the skew prior to any OCR or image segmentation processing to improve accuracy and processing efficiency and to minimize the utilization of system resources. The system may utilize an algorithm to evaluate and correct a skew within the scanned image. Specifically, the system may detect a block of text within an image, utilize thresholding (binarization) to convert all pixels in a grayscale image to either black or white, and utilize Gaussian blurring to reduce image noise to create blobs of text. As referred to herein, thresholding may be used to create one or more binary images, which may be determined by a threshold. For example, an image or any portion thereof may be composed of a plurality of pixels, in which each pixel may be compared with the threshold to determine color setting. For example, if an intensity level of the pixel is less than the threshold, the pixel may be converted to a first color, such as black, and if an intensity level of the pixel exceeds the threshold, the pixel may be converted to a second color, such as white. In this manner, one or more portions of the image may be binarized using the determined threshold values and further processing of the image may continue, such as the enhanced OCR image segmentation processing of the systems and methods disclosed herein, the results of which may improve upon increased image quality.

The angle of skewed text may be computed and the system may rotate the image by the computed angle to correct the skew. The system may utilize additional enhanced image processing techniques to optimize the image for OCR processing, which may include de-noising, resizing, removal of scanning artifacts, and thresholding (binarization).

At block 208, a first pass of OCR processing may be performed on the enhanced image, and the resulting electronic conversion of the image into machine-encoded text may be stored, for example in memory.

At block 210, the resulting text that is extracted from each image may be fed into a model which classifies the image for image segmentation processing, which may improve accuracy and reduce runtime of OCR processing. The model may be dynamically updated in real time. For example, a certain type of image may require a different OCR model based on its font type. In one embodiment, for electronic return mail processing, there are multiple different types of mail to be processed, which may include statements, generic letters, welcome kits, and unspecified mail. It is important to differentiate between these different types of mail, which must be processed differently. For example, relevant information that the system may extract from the image, which may include customer name, address, and/or account number may be in different areas of the image based on what type of mail it is. Statements may have name and address in the bottom right whereas letters may have name and address at the top left of the image.

In one embodiment, the system may perform image segmentation by applying the same OCR model to all of the images to generate the text associated with each image. The system may then extract expressions via a keyword search to decide which type of mail corresponds to the associated image. The system may also apply natural language processing to extract expressions.

In another embodiment, the system may utilize a deep learning image classifier, which may be built using a convolutional neural network. For example, the architecture of the deep learning image classifier model may include three layers of convolution followed by ReLU activation and max pooling, one fully connected layer followed by ReLU activation and dropout, and 1 fully connected layer followed by sigmoid activation. To train the deep learning image classifier additional images may be generated by augmenting the original images by scaling and translating them.

The OCR models may be configured to associate specific areas of an image with particular information, for example, customer name and address, and/or account number, to efficiently select which area of an image needs to be converted to text to extract particular information. For each type of image, as may be identified by the image classifier, these areas may be different. Additionally, these areas may change slightly due to natural translations that occur when an image is scanned (or slightly different letter formats). As such, to improve accuracy, an integrated combination of dynamic image processing techniques may be utilized to select the region of interest, which improves accuracy compared to utilizing hardcoded regions.

Specifically, for each type of image a set of coordinates is determined associated with where a given piece of text is reliably expected to be located. Additionally a general shape of the associated blob of text is determined. For example, for a piece of mail, a name and address block may include a rectangular shape with a slightly higher width than height, which may correspond to a block of text with several lines, whereas an account number block may include a rectangular shape with a much higher width than height, which may correspond to a single line of text.

Utilizing the generated set of coordinates, the system may perform the following on the image binarization to convert all pixels in grayscale image to either black or white, Gaussian blurring to reduce image noise and creates "blobs" of text, calculation of shape characteristics, which may include width, height and aspect ratio, elimination of shapes that do not meet the expected criteria, for example shapes that are too small or are not wide enough, and choosing the shape that is closest to the expected location.

At block 212, based on the image segmentation and classification processing, the system may utilize and select different OCR models, to perform a second pass of OCR processing based on the image classification. At block 214, the output responsive to the second pass of OCR processing may be received.

The process may end at block 216.

Figure 3:
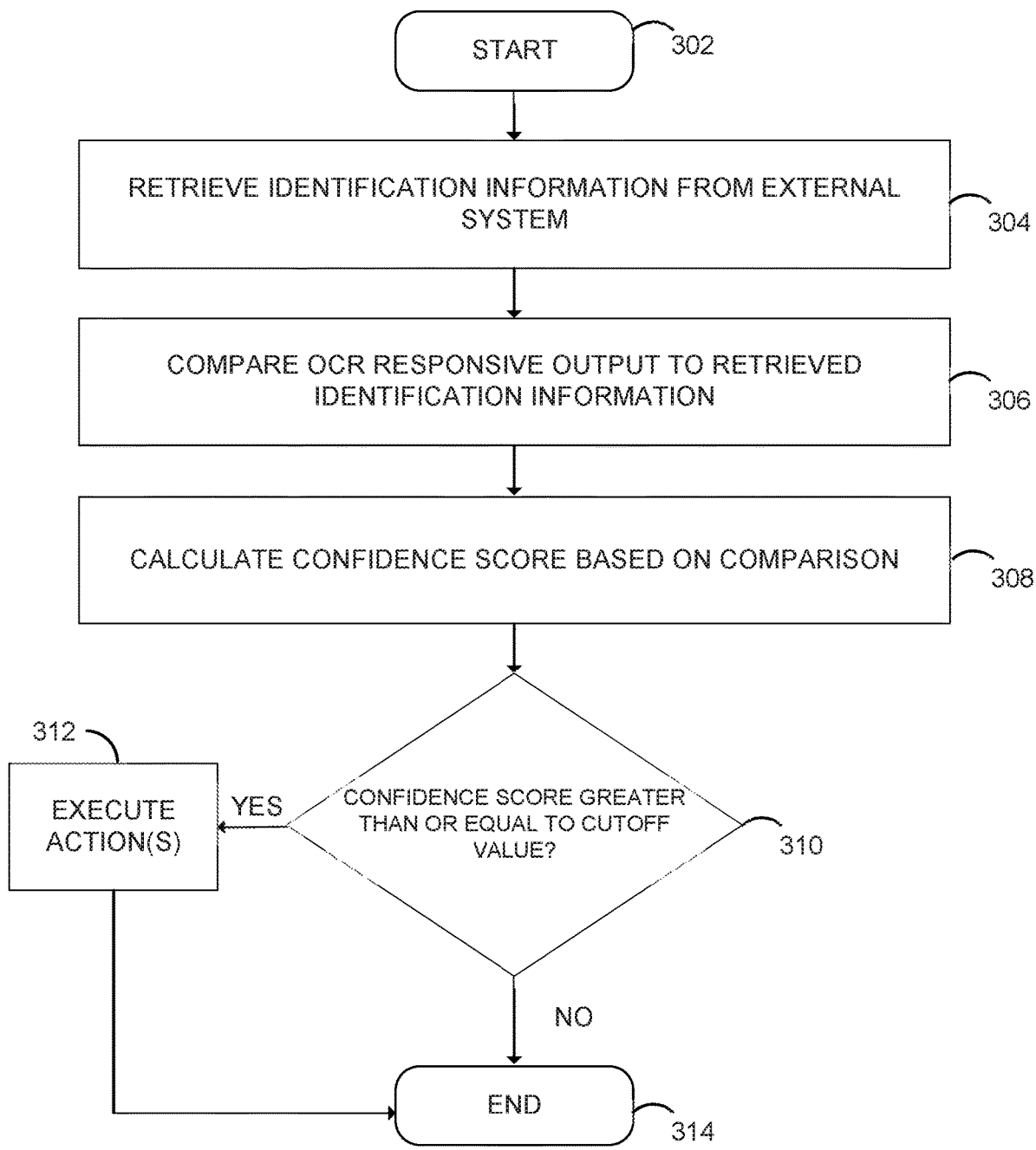
FIG. 3 illustrates an example flow diagram illustrating a method for automatically evaluating contextual and identification information and associated metadata extracted via enhanced OCR processing, according to embodiments of the disclosure.

FIG. 3 illustrates an example flow diagram illustrating a method for automatically evaluating contextual and identification information and associated metadata extracted via enhanced OCR processing, according to embodiments of the disclosure.

The process may begin and block 302. At block 304, the recognized text received as the output to the second pass of OCR processing may be utilized to identify which account an image may be associated with. Associated identification information may be retrieved from an external system, which may include an account provider system. At block 306, the system may compare a customer name extracted from the image to the name associated with an account (i.e. the name stored by the financial institution system), which may be utilized by the system, at block 308, to calculate a confidence score. For example, a string similarity algorithm, such as the Levenshtein distance may be utilized to produce a confidence score. Similarly, once an account has been matched to a piece of return mail, the address stored by the financial institution system may be compared to the address extracted from the image via the enhanced OCR processing to generate a confidence score.

At block 310, the system may evaluate a confidence score based on an optimally determined cutoff value. If the confidence score is determined to below the determined cutoff value, the processing may end at block 314. If the confidence score is determined to be greater than or equal to the cutoff value, the system may determine, at block 312, that the text extracted from the image and the system stored text are a match, and may determine a required action(s) based on the OCR processing. For example, in evaluating the address on a piece of return mail, if the confidence score is above a certain cutoff, the system may determine that the two addresses are a match.

The process may end at block 314.

FIG. 4 depicts an example user interface 400 for a case management system that may execute one or more actions based on OCR processing. Based on the system generated confidence score, the system may determine an action required based on the OCR processing, which may include automatically executing an action via a specialized user interface application 400. For example, in processing return mail, based on the confidence score and whether the associated account already has a return mail flag, the system may add a return flag via a specialized user interface application, or the system may perform no action. Specifically, the system may perform enhanced OCR processing to accurately and efficiently extract the following information from the image of a return piece of mail: customer name, customer address, and/or account number. The system may concurrently extract information from a database of a financial institution system, which may include customer name, customer address, account number and/or credit card portfolio information.

The system may generate a report of cases requiring execution of an action based on the OCR processing. For example the report may include a list of return mail cases to be processed. The system may also utilize a specialized user interface, which may include a case management system to execute an action based on the OCR processing. Based on extraction information and the confidence score, an account may be flagged and/or queued for processing. For example, the system may transmit particular identified accounts to an application, which may include a web and/or mobile application, which may be accessed via a user interface.

The metadata associated with each image, such as the credit card portfolio, may be utilized to segment cases into different queues, which may allow for higher efficiency, as well as prioritizing cases that require immediate action, or cases that have a high probability of requiring action (if the address on the image is very similar to the address in the database, it will likely require a return mail flag to be added). For example, an account associated with an item of returned mail may be flagged and distributed to a workflow queue to be evaluated and for follow up by a user of the application. The workflow queue may be associated with, for example, a particular user agent, type of returned mailed, and/or customer. Such account entries may be updated in real time. The user interface may provide queue overviews, which may indicate which queues have the highest volumes, and may also provide case summaries for particular actions generated from the OCR processing. Additionally, by providing an account number of all images at a given time, the application may be utilized to automatically close out multiple cases associated with a single account number. For example, for 1000 open cases at a given point in time, and within that group of 1000, there are five cases (pieces of mail/images) that all belong to the same account (customer), once an agent takes action with one of those cases (i.e. adds a return mail flag), the other cases associated with that account may be closed out since nothing else needs to be done.

The system may utilize machine learning to process and cluster the extracted data and associated processing and action information. Information used to process and cluster the extracted data may include type of mail, and address match to automatically generate additional training data, which may be utilized to improve the system training model to further enhance the OCR processing. For example, the system can utilize gradient boosting machine and logistic regression machine learning algorithms. As another example of machine learning, the system can utilize neural networks, such as convolutional neural networks or recurrent neural networks.

Figure 5:
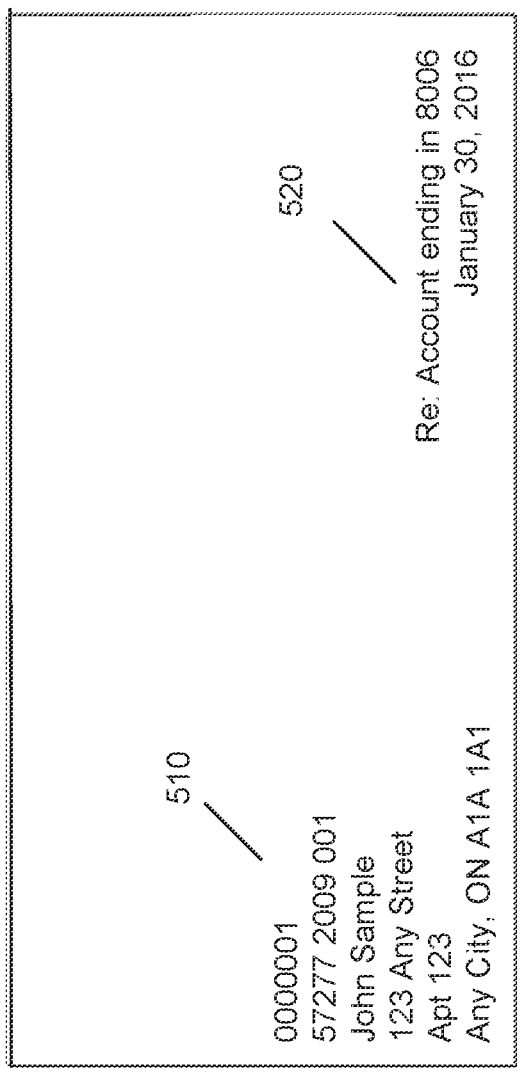
FIG. 5 depicts an image captured illustration for enhanced OCR image segmentation processing, according to embodiments of the disclosure.

FIG. 5 depicts an image captured illustration 500 for enhanced OCR image segmentation processing. FIG. 5 may reference or incorporate any and all of system 100 of FIG. 1, method 200 of FIG. 2, method 300 of FIG. 3, and method 400 of FIG. 4.

Illustration 500 may comprise any document, including but not limited to an envelope, mail, letter that is subject for the enhanced OCR image segmentation processing as described by the systems and methods herein. Illustration 500 may comprise a plurality of fields corresponding to one or more regions of the illustration. For example, at least one of the plurality of fields of illustration 500 may comprise customer information 510. Without limitation, customer information 510 may comprise at least one selected from the group of customer first name, customer middle name, customer last name, customer address including any of street name, P.O. Box, apartment number, building number, city, state, zip code, postal code, county, province, country, email address, telephone number. It is understood that any number of these types of information may be partially or fully included and/or abbreviated on the illustration 500, and it is not necessarily that all of these fields are included on illustration 500. It is understood that any number of these types of information may be partially or fully redacted. For example, as illustrated in FIG. 5, customer information 510 includes customer first name "John", customer last name "Sample", address "123 Any Street", apartment number "123", city "Any City", province "Ontario" abbreviated "ON", and postal code "A1A 1A1".

For example, at least one of the plurality of fields of illustration 500 may comprise account information 520. Without limitation, account information 520 may comprise at least one selected from the group of credit card number, debit card number, account number, gift card number. It is understood that any number of these types of information of account information 520 may be partially or fully included and/or abbreviated on the illustration 500, and it is not necessarily that all of these fields are included on illustration 500. It is understood that any number of these types of information of account information 520 may be partially or fully redacted. For example, as illustrated in FIG. 5, only a portion of the account number 520 is shown. The portion may comprise the last four digits of the account number 520, and in this case, the portion includes "8006."

As previously explained, the systems and methods described herein may be configured to scan illustration 500 for enhanced OCR image segmentation processing, and in particular, for automatically evaluating contextual and identification information and associated metadata extracted via enhanced OCR processing, as illustrated in FIG. 1, FIG. 2, FIG. 3, and FIG. 4. For example, the illustration 500 may include one or more images, each corresponding to one or more fields, including but not limited to field 510 and field 520. Each image, such as image corresponding to field 510, may be optimized utilizing enhanced image processing techniques. The image may be processed through a first OCR pass. Image segmentation may be performed to classify the image. The image may then be processed through a second OCR pass utilizing a classified image model before receiving output responsive to OCR. Also, multiple different types of mail may be processed, which may include without limitation, statements, generic letters, welcome kits, and unspecified mail. It is important to differentiate between these different types of mail, which must be processed differently. For example, relevant information that the system may extract from the image, which may include customer name, address, and/or account number may be in different areas of the image based on what type of mail it is.

Statements may have name and address in the bottom right whereas letters may have name and address at the top left of the image.

Figure 6:
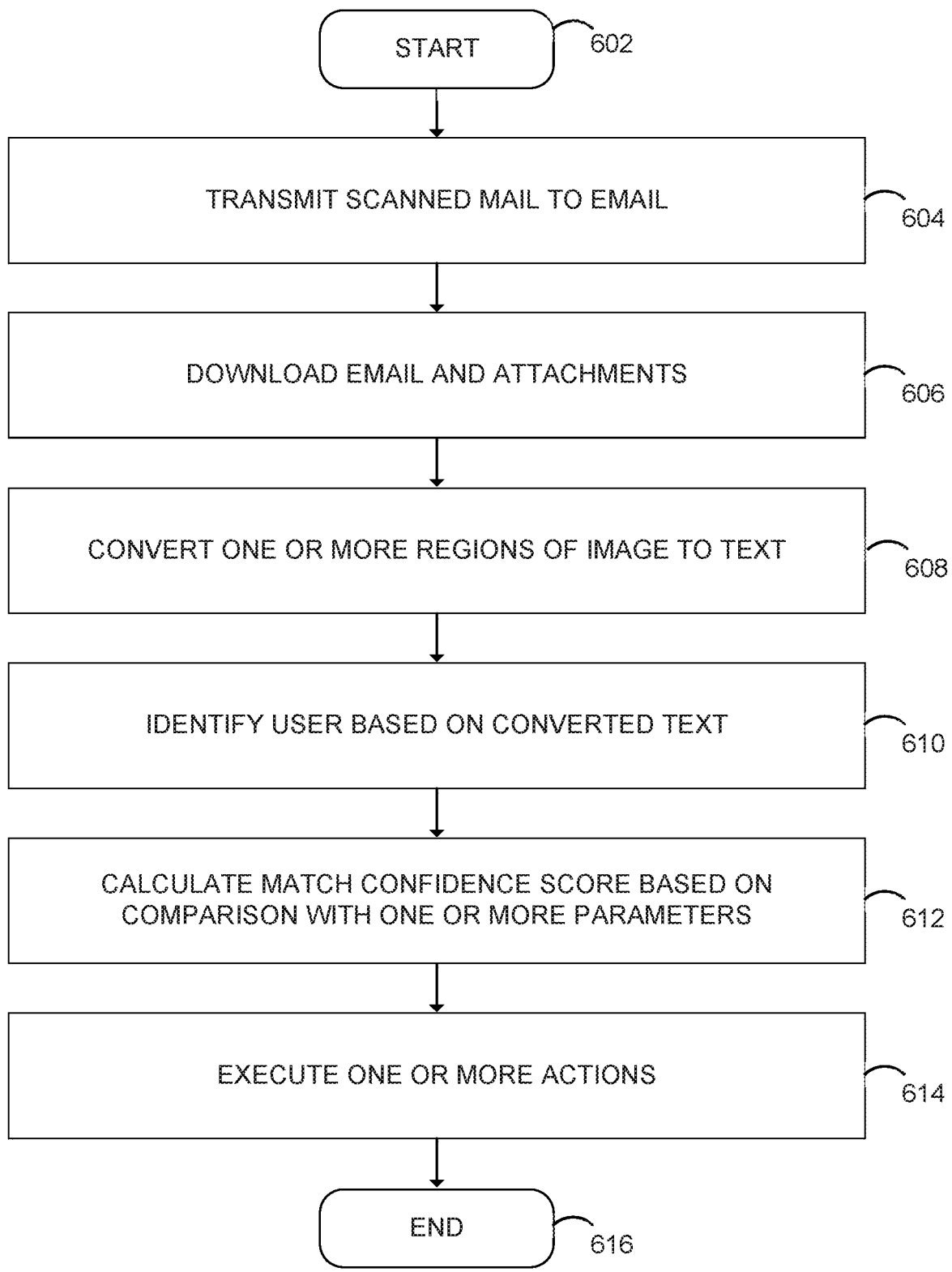
FIG. 6 illustrates an example flow diagram illustrating a method for executing one or more actions after enhanced OCR image segmentation processing, according to embodiments of the disclosure.

FIG. 6 illustrates an example flow diagram illustrating a method 600 for executing one or more actions after enhanced OCR image segmentation processing. FIG. 6 may reference or incorporate any and all of system 100 of FIG. 1, method 200 of FIG. 2, method 300 of FIG. 3, method 400 of FIG. 4, and illustration 500 of FIG. 5.

The method 600 may begin at block 602. At block 604, the method 500 may include transmitting scanned mail to email. For example, mail may comprise illustration, such as illustration 500. The mail may be sent to a single email account. For example, the mail may be scanned and sent as one or more attachments. In another example, the mail may be scanned and may be uploaded to a folder for subsequent download. Also, multiple different types of mail may be processed, which may include without limitation, statements, generic letters, welcome kits, and unspecified mail. It is important to differentiate between these different types of mail, which must be processed differently. For example, relevant information that the system may extract from the image, which may include customer name, address, and/or account number may be in different areas of the image based on what type of mail it is. Statements may have name and address in the bottom right whereas letters may have name and address at the top left of the image.

At block 606, the method 600 may include downloading the email and attachments. For example, the attachments of block 604 may be downloaded and saved into a folder.

At block 608, the method 600 may include converting one or more regions of image to text. For example, a received image may be skewed, as the associated scan may be rotated at an angle. The system may correct the skew prior to any OCR or image segmentation processing to improve accuracy and processing efficiency and to minimize the utilization of system resources. The system may utilize an algorithm to evaluate and correct a skew within the scanned image. Specifically, the system may detect a block of text within an image, utilize thresholding (binarization) to convert all pixels in a grayscale image to either black or white, and utilize Gaussian blurring to reduce image noise to create blobs of text. The angle of skewed text may be computed and the system may rotate the image by the computed angle to correct the skew.

The system may utilize additional enhanced image processing techniques to optimize the image for OCR processing, which may include de-noising, resizing, and thresholding (binarization). As referred to herein, thresholding may be used to create one or more binary images, which may determined by a threshold. For example, an image or any portion thereof may be composed of a plurality of pixels, in which each pixel may be compared with the threshold to determine color setting. For example, if an intensity level of the pixel is less than the threshold, the pixel may be converted to a first color, such as black, and if an intensity level of the pixel exceeds the threshold, the pixel may be converted to a second color, such as white. In this manner, one or more portions of the image may be binarized using the determined threshold values and further processing of the image may continue, such as the enhanced OCR image segmentation processing of the systems and methods disclosed herein.

In some examples, a first pass of OCR processing may be performed on the enhanced image, and the resulting electronic conversion of the image into machine-encoded text may be stored, for example in memory. The resulting text that is extracted from each image may be fed into a model which classifies the image for image segmentation processing, which may improve accuracy and reduce runtime of OCR processing. The model may be dynamically updated in real time. For example, a certain type of image may require a different OCR model based on its font type. In one embodiment, for electronic return mail processing, there are multiple different types of mail to be processed, which may include statements, generic letters, welcome kits, and unspecified mail. It is important to differentiate between these different types of mail, which must be processed differently. For example, relevant information that the system may extract from the image, which may include customer name, address, and/or account number may be in different areas of the image based on what type of mail it is. Statements may have name and address in the bottom right whereas letters may have name and address at the top left of the image.

In one embodiment, the system may perform image segmentation by applying the same OCR model to all of the images to generate the text associated with each image. The system may then extract expressions via a keyword search to decide which type of mail corresponds to the associated image. The system may also employ natural language processing to extract expressions.

In another embodiment, the system may utilize a deep learning image classifier, which may be built using a convolutional neural network. For example, the architecture of the deep learning image classifier model may include three layers of convolution followed by ReLU activation and max pooling, one fully connected layer followed by ReLU activation and dropout, and 1 fully connected layer followed by sigmoid activation. To train the deep learning image classifier additional images may be generated by augmenting the original images by scaling and translating them.

The OCR models may be configured to associate specific areas of an image with particular information, for example, customer name and address, and/or account number, to efficiently select which area of an image needs to be converted to text to extract particular information. For each type of image, as may be identified by the image classifier, these areas may be different. Additionally, these areas may change slightly due to natural translations that occur when an image is scanned (or slightly different letter formats). As such, to improve accuracy, an integrated combination of dynamic image processing techniques may be utilized to select the region of interest, which improves accuracy compared to utilizing hardcoded regions.

Specifically, for each type of image a set of coordinates is determined associated with where a given piece of text is reliably expected to be located. Additionally a general shape of the associated blob of text is determined. For example, for a piece of mail, a name and address block may include a rectangular shape with a slightly higher width than height, which may correspond to a block of text with several lines, whereas an account number block may include a rectangular shape with a much higher width than height, which may correspond to a single line of text.

Utilizing the generated set of coordinates, the system may perform the following on the image binarization to convert all pixels in grayscale image to either black or white, Gaussian blurring to reduce image noise and creates "blobs" of text, calculation of shape characteristics, which may include width, height and aspect ratio, elimination of shapes that do not meet the expected criteria, for example shapes that are too small or are not wide enough, and choosing the shape that is closest to the expected location.

Based on the image segmentation and classification processing, the system may utilize and select different OCR models, to perform a second pass of OCR processing based on the image classification. Output responsive to the second pass of OCR processing may be received.

At block 610, the method 600 may include identifying a user based on the text. For example, the method may include identifying a user based on the converted image text based on the output responsive to the second pass of OCR processing. The recognized text received as the output to the second pass of OCR processing may be utilized to identify which account an image may be associated with. The text may be compared with reference text stored or otherwise accessible via in one or more servers and/or databases. For example, the converted image text may include at least one selected from the group of customer information, account information, and/or any combination thereof. For example, the mail may comprise a first region including customer information and a second region including account information. In some examples, the first region may be located in a different area from the second region. OCR processing each of these regions may result in text that can be compared to reference customer information, reference account information, and/or any combination thereof such that the user may be identified based on the recognized text. Contrary to the OCR processing on all images that yields resulting text which is stored, another OCR processing step focuses on specific regions of each document that contains, without limitation, customer information and account information. In this manner, the customer names and account information extracted from the images are used to determine the account associated with the piece of return mail. The account identifier may then be extracted from the image in order to determine the account associated with the return piece of mail. When this is not available, another rule may be triggered in which the name and last 4 digits of the account number is used. For example, the reference address may be compared to the address on the piece of return mail once an account has been matched to a piece of return mail.

At block 612, the method 600 may include calculating a match confidence score based on comparison with one or more parameters. Associated identification information may be retrieved from an external system, which may include an account provider system. For example, the system may compare a customer name extracted from the image to the name associated with an account (i.e. the name stored by the financial institution system), which may be utilized by the system to calculate a confidence score. For example, a string similarity algorithm, such as the Levenshtein distance may be utilized to produce a confidence score. Similarly, once an account has been matched to a piece of return mail, the address stored by the financial institution system may be compared to the address extracted from the image via the enhanced OCR processing to generate a confidence score.

The system may evaluate a confidence score based on an optimally determined cutoff value. If the confidence score is determined to below the determined cutoff value, the processing may end. If the confidence score is determined to be greater than or equal to the cutoff value, the system may determine that the text extracted from the image and the system stored text are a match, and may determine a required action based on the OCR processing (see block 614). For example, in evaluating the address on a piece of return mail, if the confidence score is above a certain cutoff, the system may determine that the two addresses are a match.

At block 614, the method 600 may include executing one or more actions. For example, based on the results of the match confidence score, the method may include decided whether to include or exclude a return mail flag. For example, one or more actions may include adding a return mail flag if the confidence score is below a threshold. In another example, a flag may be updated to identify that the address on file is correct or incorrect. The flag may be used to suppress future mail from being sent to the address, which would also be eliminated from being the subject of extraction and subsequent evaluation.

In this manner, the systems and methods described herein overcome the deficiencies associated with the inability to have multiple agents working cases simultaneously, handling large backlogs across multiple spreadsheets, and confidently track case closures by providing an improved interface that allows for working on cases simultaneously, better organization on prioritizing cases, and case searching and filtering through extracting and automatically evaluating contextual and identification information and associated metadata from an image utilizing enhanced image processing techniques and image segmentation only on regions of interest.

At block 616, the method 600 may end.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

The invention claimed is:

1. An optical character recognition method, comprising:
optimizing the image quality of an image;

performing optical character recognition on the optimized image;

evaluating text extracted from the image utilizing a deep learning image classifier to classify an image type for the image, wherein the deep leaning image classifier is trained with additional images generated by scaling and translating original images;

selecting an optical character recognition model based on the classified image type;

performing optical character recognition on the optimized image utilizing the selected model to generate recognized text and to extract identification and metadata information associated with the image from the recognized text;

evaluating the extracted identification and metadata information associated with the image from the recognized text to link the image to an online account associated with the image;

comparing a data value extracted from the recognized text for a particular data type with an associated online account data value for the particular data type; and evaluating whether to automatically execute an action associated with the online account linked to the image based on the comparison, wherein the action comprises at least one selected from the group of adding a return mail flag.

2. The optical character recognition method of claim 1, wherein the action comprises executing a visual workflow builder.

3. The optical character recognition method of claim 1, wherein the action comprises flagging the online account for processing.

4. The optical character recognition method of claim 1, further comprising generating a confidence score based on the comparison of the data value extracted from the recognized text with the associated online account data value.

5. The optical character recognition method of claim 4, further comprising evaluating the confidence score based on a determined cutoff value to determine whether to automatically execute the action associated with the online account linked to the image.

6. The optical character recognition method of claim 1, wherein optimizing the image quality of the image comprises computing an angle of skewed text and rotating the image by the computed angle to correct the skew.

7. The optical character recognition method of claim 1, wherein optimizing the image quality of the image comprises at least one selected from the group of de-noising, resizing, and thresholding.

8. An optical character recognition system, comprising:
a processor; and
a memory comprising instructions operable to be executed by the processor,
wherein the processor is configured to:
optimize the image quality of an image,
perform optical character recognition on the optimized image,
evaluate text extracted from the image utilizing a deep learning image classifier to classify an image type for the image, wherein the deep leaning image classifier is trained with additional images generated by scaling and translating original images,
select an optical character recognition model based on the classified image type,
perform optical character recognition on the optimized image utilizing the selected model to generate recognized text and to extract identification and metadata information associated with the image from the recognized text evaluate the extracted identification and metadata information associated with the image from the recognized text to link the image to an online account associated with the image;

compare a data value extracted from the recognized text for a particular data type with an associated online account data value for the particular data type; and evaluate whether to automatically execute an action associated with the online account linked to the image based on the comparison, wherein the action comprises at least one selected from the group of adding a return mail flag.

9. The optical character recognition system of claim 8, wherein:
the deep learning image classifier comprises a convolutional neural network, and
an architecture of the convolutional neural network includes three layers of convolution followed by activation and pooling, a fully connected layer followed by activation and dropout, and a fully connected layer followed by sigmoid activation.

10. The optical character recognition system of claim 8, wherein:
the image comprises a digitized document, and
the image is received from at least one selected from the group of a scanner, a sensor, a camera, and a mobile device.

11. The optical character recognition system of claim 8, wherein the image type comprises at least one selected from the group of a statement, a letter, a welcome kit, and an unspecified mail.

12. A non-transitory computer-accessible medium storing instructions operable to be executed by a processor, wherein, upon execution of the instructions, the processor is configured to perform procedures comprising:
optimizing the image quality of an image;
performing optical character recognition on the optimized image;
evaluating text extracted from the image utilizing a deep learning image classifier to classify an image type for the image, wherein the deep leaning image classifier is trained with additional images generated by scaling and translating original images;
selecting an optical character recognition model based on the classified image type;
performing optical character recognition on the optimized image utilizing the selected model to generate recognized text and to extract identification and metadata information associated with the image from the recognized text
evaluating the extracted identification and metadata information associated with the image from the recognized text to link the image to an online account associated with the image;
comparing a data value extracted from the recognized text for a particular data type with an associated online account data value for the particular data type; and
evaluating whether to automatically execute an action associated with the online account linked to the image based on the comparison, wherein the action comprises at least one selected from the group of adding a return mail flag.

13. The computer-accessible medium of claim 12, the procedures further comprising:
   utilizing machine learning to process and cluster the extracted data and associated processing and action information; and
   generating additional training data for the optical character recognition model using the extracted data.

14. The computer-accessible medium of claim 13, wherein information used to process and cluster comprises at least one selected from the group of a type of mail and an address match.

15. The computer-accessible medium of claim 13, wherein the machine learning comprises at least one selected from the group of gradient boosting machine and logistic regression.

16. The computer-accessible medium of claim 12, the procedures further comprising:
   generating regions of interest that associate specific areas of the image with particular information; and
   performing optical character recognition only on the regions of interest.

* * * * *